(12) United States Patent
Hayashi et al.

(10) Patent No.: US 10,200,130 B2
(45) Date of Patent: Feb. 5, 2019

(54) OPTICAL TRANSMITTER

(71) Applicant: Mitsubishi Electric Corporation, Chiyoda-ku (JP)

(72) Inventors: Shusaku Hayashi, Tokyo (JP); Satoshi Nishikawa, Tokyo (JP); Koichi Akiyama, Tokyo (JP); Eiji Yagyu, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/417,617

(22) Filed: Jan. 27, 2017

(65) Prior Publication Data
US 2017/0244491 A1  Aug. 24, 2017

(30) Foreign Application Priority Data

Feb. 19, 2016 (JP) .................................. 2016-029677
Nov. 30, 2016 (JP) .................................. 2016-232311

(51) Int. Cl.
*G02F 1/21* (2006.01)
*G02F 1/225* (2006.01)
(Continued)

(52) U.S. Cl.
CPC ........... *H04B 10/54* (2013.01); *G02F 1/2255* (2013.01); *H04B 10/501* (2013.01);
(Continued)

(58) Field of Classification Search
CPC .. H04B 2210/003; H04B 10/00; H04B 10/54; H04B 10/501; H04B 10/04;
(Continued)

(56) References Cited

U.S. PATENT DOCUMENTS 6,985,648 B2 * 1/2006 Kish, Jr. ................ B82Y 20/00
385/1
7,043,109 B2 * 5/2006 Kish, Jr. ................ B82Y 20/00
356/237.4
(Continued)

FOREIGN PATENT DOCUMENTS

JP    2009-244682    10/2009
JP    2011-112873     6/2011
JP    2011-188213     9/2011

*Primary Examiner* — Kenneth N Vanderpuye
*Assistant Examiner* — Abbas H Alagheband
(74) *Attorney, Agent, or Firm* — Oblon, McClelland, Maier & Neustadt, L.L.P.

(57) ABSTRACT

An optical transmitter includes: a splitter; a first optical modulator and a second optical modulator that modulate each of light beams split by the splitter; a first semiconductor optical amplifier (SOA) and a second SOA that are connected to a subsequent stage of the first optical modulator and a subsequent stage of the second optical modulator, respectively; a first detector and a second detector that detect light output intensity of the first SOA and light output intensity of the second SOA, respectively; a controller that sets gains of the first and second SOAs such that the first and second SOAs are equal in the light output intensity based on detection values of the first and second detectors; and a combiner that combines an output light beam of the first SOA and an output light beam of the second SOA.

7 Claims, 9 Drawing Sheets

(51) Int. Cl.
*H04B 10/50* (2013.01)
*H04B 10/54* (2013.01)
*H04B 10/532* (2013.01)
*H04B 10/564* (2013.01)
*H04B 10/00* (2013.01)

(52) U.S. Cl.
CPC .... *G02F 2001/212* (2013.01); *G02F 2201/58* (2013.01); *G02F 2203/07* (2013.01); *G02F 2203/70* (2013.01); *H04B 10/532* (2013.01); *H04B 10/564* (2013.01)

(58) Field of Classification Search
CPC .......... H04B 10/5053; H04B 10/50575; H04B 10/5561; H04B 10/564; H04B 10/50; H04J 14/0221; H04J 14/00; H01S 3/06758; H01S 5/50; G02F 1/2255; G02F 2001/212; G02F 2201/58; G02F 2203/07
USPC ........................................ 398/186, 183, 160
See application file for complete search history.

(56) References Cited

U.S. PATENT DOCUMENTS

| | | | | |
|---|---|---|---|---|
| 7,079,715 B2* | 7/2006 | Kish, Jr. | ................ | B82Y 20/00 385/14 |
| 7,539,365 B2* | 5/2009 | Welch | ................ | G02B 6/12004 372/26 |
| 7,697,580 B2* | 4/2010 | Smith | ................ | B82Y 20/00 372/29.011 |
| 7,907,324 B2* | 3/2011 | Hoshida | ................ | G02F 1/0123 359/239 |
| 7,978,390 B2* | 7/2011 | Kikuchi | ................ | G02F 1/225 359/238 |
| 8,306,431 B2* | 11/2012 | Takahara | ........... | H04B 10/5053 398/152 |
| 9,197,328 B2* | 11/2015 | Yamanaka | ......... | H04B 10/5053 |
| 9,614,639 B2* | 4/2017 | Nilsson | ............. | H04B 10/0775 |
| 9,641,257 B2* | 5/2017 | Sugihara | .............. | G02F 1/0123 |
| 9,885,557 B2* | 2/2018 | Wang | ................ | G01B 9/02011 |
| 9,954,638 B2* | 4/2018 | Sugiyama | ............... | H04J 14/06 |
| 2005/0084202 A1* | 4/2005 | Smith | .................... | B82Y 20/00 385/14 |
| 2005/0094925 A1* | 5/2005 | Kish, Jr. | ................ | B82Y 20/00 385/14 |
| 2006/0023992 A1* | 2/2006 | Kish, Jr. | ................ | B82Y 20/00 385/14 |
| 2009/0244685 A1* | 10/2009 | Hoshida | ................ | G02F 1/0123 359/279 |
| 2010/0260504 A1* | 10/2010 | Takahara | ........... | H04B 10/5053 398/152 |
| 2011/0076020 A1* | 3/2011 | Nilsson | .............. | H04B 10/0775 398/65 |
| 2011/0150471 A1* | 6/2011 | Joyner | ................ | H04B 10/506 398/58 |
| 2011/0179299 A1* | 7/2011 | Piwonka | ................ | G06F 1/3203 713/323 |
| 2011/0249936 A1* | 10/2011 | Welch | ................... | B82Y 20/00 385/31 |
| 2012/0008963 A1* | 1/2012 | Aruga | ................ | H04B 10/5053 398/183 |
| 2012/0050844 A1* | 3/2012 | Nishihara | .......... | H04B 10/5053 359/337.13 |
| 2013/0025374 A1* | 1/2013 | Voskoboinik | ...... | G01D 5/35303 73/655 |
| 2013/0216220 A1* | 8/2013 | Yamanaka | ......... | H04B 10/5053 398/38 |
| 2015/0236792 A1* | 8/2015 | Sugihara | ............... | H04B 10/564 398/183 |
| 2017/0033884 A1* | 2/2017 | Sugiyama | ............... | H04J 14/06 |

* cited by examiner

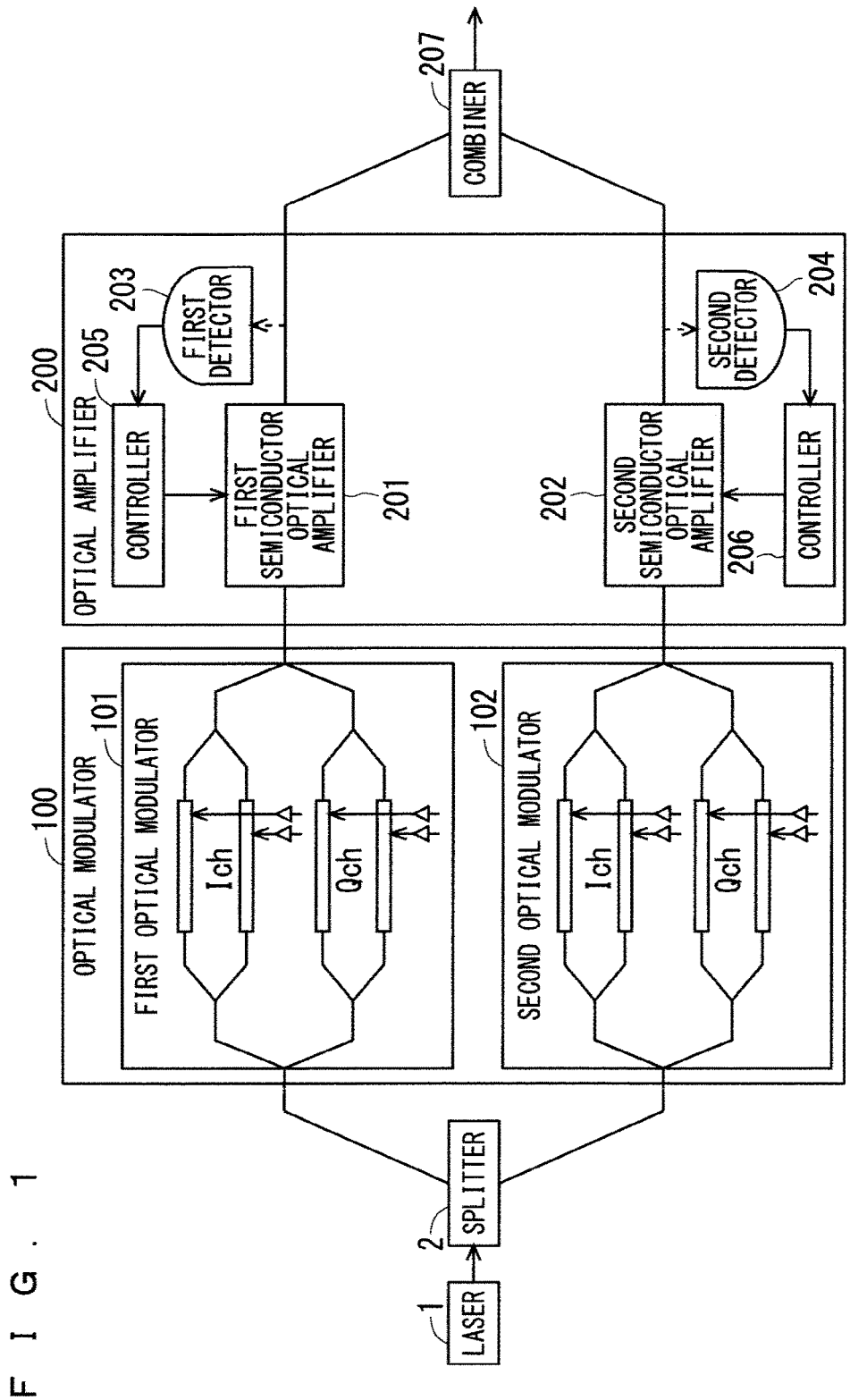
F I G. 1

F I G . 2
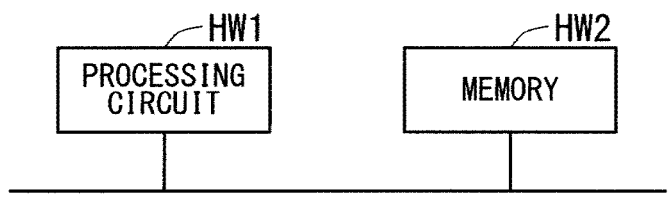

F I G. 7
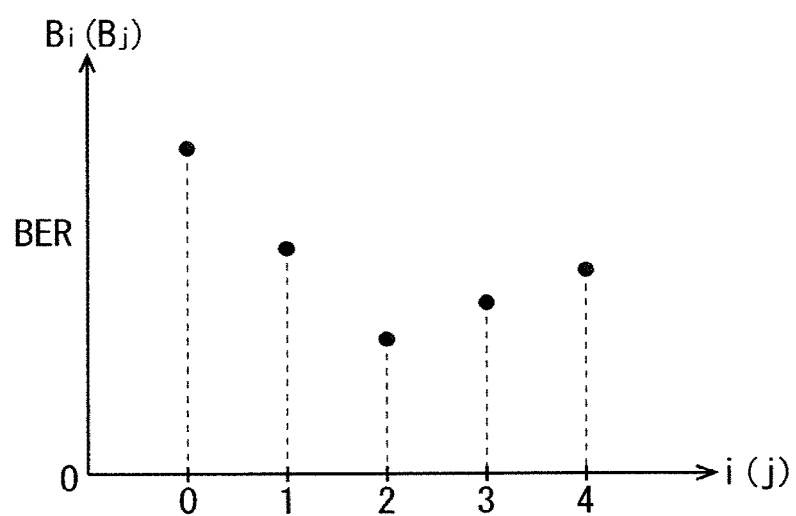

OPTICAL TRANSMITTER

BACKGROUND OF THE INVENTION

Field of the Invention

The present invention relates to an optical transmitter, and more particularly, to an optical transmitter that amplifies a modulated light beam with a semiconductor optical amplifier.

Description of the Background Art

Examples of modulation techniques of dual polarization with a Mach-Zehnder (MZ) optical modulator include dual polarization-quadrature phase shift keying (DP-QPSK) and dual polarization quadrature amplitude modulation (DP-16QAM). The modulation techniques have a great loss, so that a configuration is known that includes a semiconductor optical amplifier (SOA) located in a subsequent stage of a modulator to increase optical output.

A configuration of a conventional optical transmitter will be described. A laser light source is split into two, which are assumed to be an X polarized wave and a Y polarized wave. After the MZ optical modulators each modulate the polarized waves, an output of the Y polarized wave is rotated by a π/2 polarized wave, and the X polarized wave and the Y polarized wave are polarized and combined. After they are polarized and combined, the SOA in the subsequent stage amplifies the output modulated signal (for example, see Japanese Patent Application Laid-Open No. 2011-188213).

A modulation loss in the MZ optical modulators, the presence or absence of a polarization rotation, or the like causes a difference in light output intensity between the X polarized wave and the Y polarized wave. Thus, a detector that detects the light output intensity is provided in each of the subsequent stages of the two MZ optical modulators, and the information is used to control a gain of each of the polarized waves in the SOA.

An optical signal transmitting device disclosed in Japanese Patent Application Laid-Open No. 2011-188213 has a configuration only applicable to an SOA that amplifies two polarized waves orthogonal to each other. Further, in a case where the information about the detected power of each of the polarized waves input to the SOA is used to control the gain of the SOA, the polarized waves may vary in the intensity since a relationship between the current flowing through the SOA and the gain actually varies with, for example, ambient temperature and individual differences of the SOA elements. The configuration for detecting the output intensity of the SOA also needs a polarization separator and a polarization rotating unit in the detector, resulting in the complicated configuration.

SUMMARY OF THE INVENTION

It is an object of the present invention to provide an optical transmitter capable of combining and transmitting modulated light beams of high quality.

An optical transmitter according to the present invention includes a splitter that splits an incident light beam into two light beams, and includes a first optical modulator and a second optical modulator of a Mach-Zehnder type that modulate each of the light beams split by the splitter. The optical transmitter further includes a first semiconductor optical amplifier and a second semiconductor optical amplifier that are connected to a subsequent stage of the first optical modulator and a subsequent stage of the second optical modulator, respectively, and includes a first detector and a second detector that detect light output intensity of the first semiconductor optical amplifier and light output intensity of the second semiconductor optical amplifier, respectively. The optical transmitter further includes a controller that sets gains of the first and second semiconductor optical amplifiers such that the first and second semiconductor optical amplifiers are equal in the light output intensity based on detection values of the first and second detectors, and includes a combiner that combines an output light beam of the first semiconductor optical amplifier and an output light beam of the second semiconductor optical amplifier. The first optical modulator, the second optical modulator, the first semiconductor optical amplifier, and the second semiconductor optical amplifier are integrated on the same substrate.

The optical transmitter according to the present invention performs feedback control on the gains based on the actual light output intensity after the amplification, so that a difference in the light output intensity between the first semiconductor optical amplifier and the second semiconductor optical amplifier can be reduced. The first and second semiconductor optical amplifiers individually amplify the modulated light beams before the combiner polarizes and combines the two modulated light beams, so that the amplification of each of the modulated light beams can be controlled with high accuracy. Further, the first and second optical modulators and the first and second semiconductor optical amplifiers are integrated on the same substrate, allowing for a reduction in size and power consumption of the optical transmitter.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a configuration of an optical transmitter according to a first preferred embodiment;

FIG. 2 is a block diagram of hardware of a controller in the optical transmitter according to the first preferred embodiment;

FIG. 7 is a graph showing a relationship between a bit error rate and count in control setting;

DESCRIPTION OF THE PREFERRED EMBODIMENTS

<First Preferred Embodiment>

Figure 3:
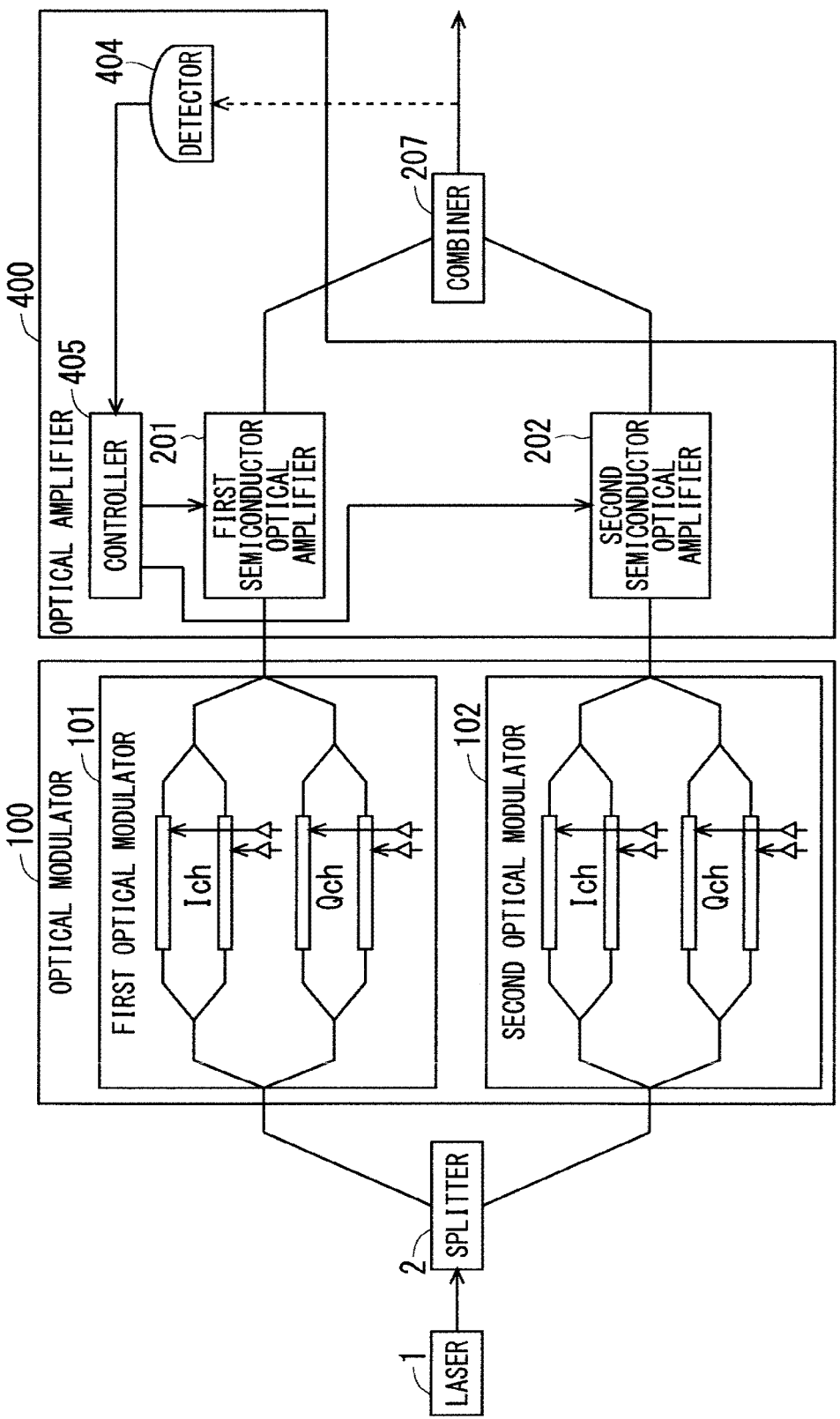
FIG. 3 is a block diagram showing a configuration of an optical transmitter according to a second preferred embodiment.

An optical transmitter in a first preferred embodiment amplifies outputs of modulated light beams from a plurality of MZ optical modulators (namely, a first optical modulator 101 and a second optical modulator 102) by a first semiconductor optical amplifier 201 and a second semiconductor optical amplifier 202 (hereinafter may also be referred to as a first SOA 201 and a second SOA 202), and detects the outputs to control gains of the first and second semiconductor optical amplifiers 201, 202 such that polarized waves do not vary in the optical output when the outputs are polarized and combined.

FIG. 1 is a block diagram showing a configuration of the optical transmitter in the first preferred embodiment. As shown in FIG. 1, the optical transmitter includes a splitter 2, an optical modulator 100, an optical amplifier 200, and a combiner 207. The splitter 2 splits a laser light beam incident from a laser 1 into two light beams. The laser light beams split by the splitter 2 are incident on the first and second optical modulators 101, 102 included in the optical modulator 100. The first and second semiconductor optical amplifiers 201, 202 included in the optical amplifier 200 amplify the light output intensity of the first and second optical modulators 101, 102. The combiner 207 polarizes and combines the optical outputs of the first and second semiconductor optical amplifiers 201, 202.

The laser 1, the splitter 2, the optical modulator 100, the optical amplifier 200, and the combiner 207 are optically connected to each other with an optical fiber or a waveguide or in the space through a lens or a mirror.

The optical modulator 100 includes the first and second optical modulators 101, 102. The first and second optical modulators 101, 102 each include two Mach-Zehnder (hereinafter may also be referred to as MZ) optical modulators. The MZ optical modulator whose component material is, for example, indium phosphide performs optical modulation by utilizing a change in refractivity due to application of an electric field, which is called an electrooptic effect. The MZ optical modulator is formed as a so-called Mach-Zehnder interferometer in which two optical waveguides including electrodes are connected in parallel between two Y-branch optical waveguides. The MZ optical modulator changes the light intensity of the light beam that passes through the Mach-Zehnder interferometer according to a phase difference between the two optical waveguides, and outputs the light beam. The phase difference is caused by a change in refractivity due to a modulation signal input to a modulation electrode and a bias voltage applied to a bias voltage. The MZ optical modulator can achieve both a signal of high quality, such as low chirp, and high speed.

Each of the first and second optical modulators 101, 102 is a dual-parallel Mach-Zehnder modulator (DP-MZM, also referred to as an I/Q modulator) in which the two MZ optical modulators are connected in parallel to serve as the MZ interferometer.

The MZ optical modulator gives a carrier wave phase difference of $\pi/2$ and multiplexes an in-phase channel (Ich) optical signal that is a real part and a quadrature-phase channel (Qch) optical signal that is an imaginary part to generate a complex photoelectric field.

The optical amplifier 200 includes the first and second SOAs 201, 202, a first detector 203, a second detector 204, a controller 205, and a controller 206.

The first SOA 201 and the second SOA 202 perform optical amplification on the optical output of the first optical modulator 101 and the optical output of the second optical modulator 102, respectively. The first detector 203 and the second detector 204 detect the light output intensity of the first SOA 201 and the light output intensity of the second SOA 202, respectively. The first and second detectors 203, 204 are, for example, a photodiode (PD). It is assumed that the first optical modulator 101, the second optical modulator 102, the first SOA 201, and the second SOA 202 are integrated on the same substrate. The first optical modulator 101 and the second optical modulator 102 may have the same structure and the same characteristics. The first SOA 201 and the second SOA 202 may have the same structure and the same characteristics.

The controller 205 controls a gain of the first SOA 201 based on the detection value of the first detector 203. The controller 206 controls a gain of the second SOA 202 based on the detection value of the second detector 204.

The first SOA 201 and the second SOA 202 are optically connected to the first detector 203 and the second detector 204, respectively, with an optical fiber or a waveguide or in the space. The controller 205 is electrically connected to the first detector 203 and the first SOA 201. Similarly, the controller 206 is electrically connected to the second detector 204 and the second SOA 202.

The configuration of the optical modulator 100 is not limited to that in FIG. 1 as long as the configuration includes the plurality of modulators. The configuration of the optical amplifier 200 is not limited to that in FIG. 1 as long as the semiconductor optical amplifiers individually amplify the optical output of each of the optical modulators and the amplified optical outputs are detected to control the gains of the semiconductor optical amplifiers.

FIG. 2 is a block diagram of hardware of the controllers 205, 206 included in the optical amplifier 200. As shown in FIG. 2, a processing circuit HW1 implements the controllers 205, 206. The processing circuit HW1 may be special hardware or a central processing unit (CPU, or also referred to as a processing unit, a microprocessing unit, a microprocessor, a microcomputer, a processor, or a DSP) that executes programs stored in a memory HW2.

For the special hardware as the processing circuit HW1, examples of the special hardware include a single circuit, a composite circuit, a programmed processor, a parallel-programmed processor, an ASIC, an FPGA, and a combination thereof.

For the CPU as the processing circuit HW1, the functions of the controllers 205, 206 are implemented by software, firmware, or a combination of the software and firmware. The software or the firmware is written as a program and stored in the memory HW2. The processing circuit HW1 reads the program stored in the memory HW2 for execution to implement the functions of the controllers 205, 206. It can also be described that the program causes a computer to execute a procedure and a method of the controllers 205, 206. Examples of the memory HW2 herein include a non-volatile semiconductor memory or a volatile semiconductor memory, such as RAM, ROM, a flash memory, EPROM, and EEPROM, a magnetic disk, a flexible disk, an optical disk, a compact disk, a mini disk, and a DVD.

The special hardware may implement some functions of the controllers 205, 206 while the software or the firmware may implement some other functions.

The configuration of the controllers 205, 206 is described above, and a controller 405 in a second preferred embodiment and a controller 603 in a third preferred embodiment, which will be described below, may also have the same configuration.

<Actions>

Actions of the optical transmitter in the first preferred embodiment will be described. In the optical transmitter, an output of the laser 1 is split into two by the splitter 2 to be input to the first and second optical modulators 101, 102 of the optical modulator 100. The first and second optical modulators 101, 102 perform modulation. The output light beam from the first optical modulator 101 and the output light beam from the second optical modulator 102 are input to the first SOA 201 and the second SOA 202, respectively.

The first SOA 201 is driven by a current according to a gain set by the controller 205 to amplify the input light beam. The first detector 203 detects the light output intensity of the output light beam from the first SOA 201. An electric signal according to the detection value of the first detector 203 is input to the controller 205. The controller 205 adjusts the gain so as to bring the detection value closer to a preset target value. Herein, the same target value is set for the controller 205 and the controller 206. In this manner, the controller 205 repeatedly performs feedback control on the detection value to adjust the gain so as to bring the detection value closer to the target value.

Similarly, the second SOA 202 is driven by a current according to a gain set by the controller 206 to amplify the input light beam. The second detector 204 detects the light output intensity of the output light beam from the second SOA 202. An electric signal according to the detection value of the second detector 204 is input to the controller 206. The controller 206 adjusts the gain so as to bring the detection value closer to a preset target value. In this manner, the controller 206 repeatedly performs feedback control on the detection value to adjust the gain so as to bring the detection value closer to the target value.

As described above, the controller 205 and the controller 206 perform the feedback control on the gain of the first SOA 201 and the gain of the second SOA 202, respectively, to adjust the light output intensity of the first and second SOAs 201, 202 to be equal to each other. Thus, when the combiner 207 polarizes and combines the outputs of the first and second SOAs 201, 202, a difference in the light output intensity between the polarized waves can be reduced.

As described above, the controllers 205, 206 set the gains of the first and second SOAs 201, 202. Changes in performance due to changes in ambient temperature of the optical transmitter and age deterioration of the first and second SOAs 201, 202 can be compensated by control described below after the gains are set.

In other words, the controller 205 causes the set gains to fluctuate at low frequencies in a time cycle. The set gains fluctuate slightly by, for example, 0.1% of the set gains. The controller 205 then sets, to a new gain, a gain when the detection value of the first detector 203 gets closer to the target value. In this manner, an appropriate gain can be continuously set by repeatedly performing the action to cause the set gain to fluctuate in the time cycle to set a new gain even in the case where the performance of the first SOA 201 changes with time.

The actions of the controller 205 are described above, and the controller 206 can also continuously set an appropriate gain by performing the same actions even in the case where the performance of the second SOA 202 changes with time.

<Effects>

The optical transmitter in the first preferred embodiment includes: the splitter 2 that splits an incident light beam into two light beams; the first optical modulator 101 and the second optical modulator 102 of the Mach-Zehnder type that modulate each of the light beams split by the splitter 2; the first SOA 201 and the second SOA 202 that are connected to the subsequent stage of the first optical modulator 101 and the subsequent stage of the second optical modulator 102, respectively; the first detector 203 and the second detector 204 that detect the light output intensity of the first SOA 201 and the light output intensity of the second SOA 202, respectively; the controllers 205, 206 that set the gains of the first and second SOAs 201, 202 such that the first and second SOAs 201, 202 are equal in the light output intensity based on the detection values of the first and second detectors 203, 204; and the combiner 207 that combines the output light beam of the first SOA 201 and the output light beam of the second SOA 202. The first optical modulator 101, the second optical modulator 102, the first SOA 201, and the second SOA 202 are integrated on the same substrate.

Therefore, the first detector 203 and the second detector 204 are located in the subsequent stage of the first SOA 201 and the subsequent stage of the second SOA 202, respectively, so that the feedback control on the gains can be performed based on the actual light output intensity after the amplification in the first preferred embodiment. The gains of the first and second SOAs 201, 202 can be appropriately set even in the case where the first and second SOAs 201, 202 are different in performance, and the difference in the light output intensity between the first and second SOAs 201, 202 can be reduced by performing the feedback control on the gains based on the actual light output intensity after the amplification. In the first preferred embodiment, the first and second SOAs 201, 202 individually amplify the two modulated light beams before the combiner 207 polarizes and combines the modulated light beams. Thus, the amplification on each of the modulated light beams can be controlled with higher accuracy than the case where the modulated light beams are amplified after being polarized and combined. Therefore, the optical transmitter in the first preferred embodiment can reduce the difference in the light output intensity between the modulated light beams with high accuracy by the simple configuration. Further, the first optical modulator 101, the second optical modulator 102, the first SOA 201, and the second SOA 202 are integrated on the same substrate in the optical transmitter in the first preferred embodiment, allowing for a reduction in size and power consumption of the optical transmitter.

In the optical transmitter in the first preferred embodiment, the controllers 205, 206 repeatedly adjust the gains of the first and second SOAs 201, 202 based on the detection values of the first and second detectors 203, 204 when the controllers 205, 206 cause the gains of the first and second SOAs 201, 202 to fluctuate in the timecycle.

Thus, the gains of the first and second SOAs 201, 202 are reset to more appropriate gains based on the detection values of the first and second detectors 203, 204 while fluctuating in the time cycle, so that the gains can be continuously set to appropriate gains even in the case where the performance of the first and second SOAs 201, 202 changes with time due to the age deterioration.

A method for controlling the optical transmitter in the first preferred embodiment includes the steps of: (a) obtaining the detection values of the first and second detectors 203, 204 while the gains of the first and second SOAs 201, 202 are caused to fluctuate in the time cycle by the controllers 205, 206; and (b) setting the gains of the first and second SOAs 201, 202 by the controllers 205, 206 such that the first and second SOAs 201, 202 are equal in the light output intensity based on the detection values of the first and second detectors 203, 204 obtained in the step (a). The steps (a) and (b) are repeatedly performed.

Therefore, the gains of the first and second SOAs 201, 202 are reset to more appropriate gains based on the detection values of the first and second detectors 203, 204 while fluctuating in the time cycle, so that the gains can be continuously set to appropriate gains even in the case where the performance of the first and second SOAs 201, 202 changes with time due to the age deterioration.

<Second Preferred Embodiment>
<Configuration>

As described above, the optical transmitter in the first preferred embodiment amplifies the output light beam from the first optical modulator 101 and the output light beam from the second optical modulator 102 by the first SOA 201 and the second SOA 202, respectively, and detects the outputs to control the gains of the first and second SOAs 201, 202 such that the polarized waves do not vary in the light output intensity when the two modulated light beams are polarized and combined.

Similarly to the first preferred embodiment, an optical transmitter in a second preferred embodiment amplifies an output light beam from a first optical modulator 101 and an output light beam from a second optical modulator 102 by a first SOA 201 and a second SOA 202, respectively, and detects the outputs by a detector to control gains of the first and second SOAs 201, 202 such that the two output light beams do not vary in the light output intensity. However, a configuration of an optical amplifier 400 and a control method are different from those in the first preferred embodiment.

FIG. 3 is a block diagram showing a configuration of the optical transmitter in the second preferred embodiment. As shown in FIG. 3, the optical transmitter includes a splitter 2, an optical modulator 100, the optical amplifier 400, and a combiner 207. The splitter 2, the optical modulator 100, and the combiner 207 are the same as those in the first preferred embodiment, so that the descriptions are omitted.

The optical amplifier 400 includes the first SOA 201, the second SOA 202, a detector 404, and a controller 405. The first SOA 201 and the second SOA 202 perform optical amplification on the optical output of the first optical modulator 101 and the optical output of the second optical modulator 102, respectively. The detector 404 detects the light output intensity of a combined light beam that has been polarized and combined by the combiner 207. The detector 404 is, for example, a photodiode (PD).

The controller 405 controls gains of the first and second SOAs 201, 202 based on the detection value of the detector 404.

The first and second SOAs 201, 202 are optically connected to the combiner 207 with an optical fiber or a waveguide or in the space while the combiner 207 is optically connected to the detector 404 with an optical fiber or a waveguide or in the space. The controller 405 is electrically connected to the detector 404 and the first and second SOAs 201, 202.

The configuration of the optical amplifier 400 is not limited to that in FIG. 3 as long as the semiconductor optical amplifiers individually amplify the optical output of each of the optical modulators and the amplified optical outputs are detected to control the gains of the semiconductor optical amplifiers.

<Actions>

Figure 4:
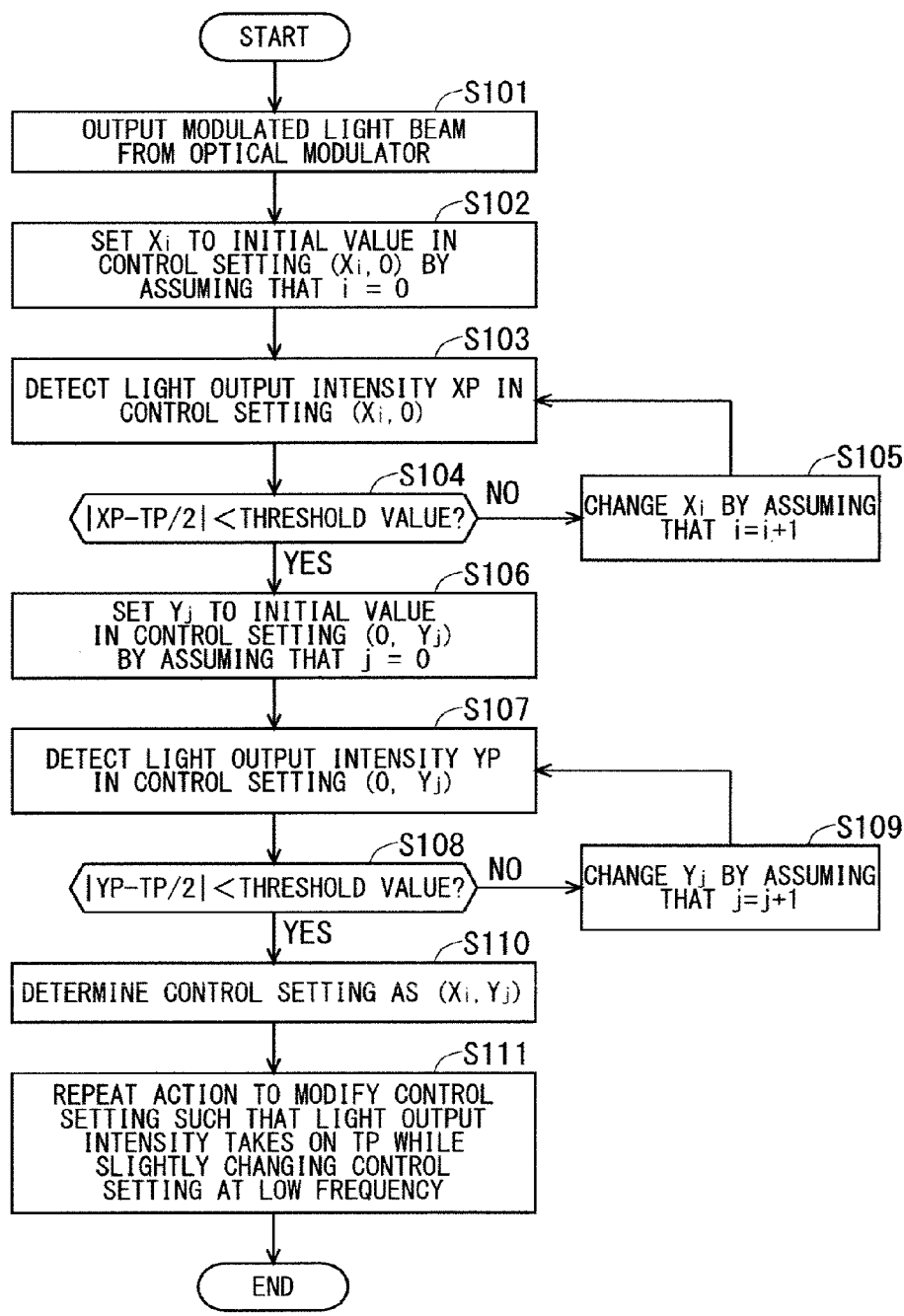
FIG. 4 is a flowchart showing actions of the optical transmitter according to the second preferred embodiment.

FIG. 4 is a flowchart showing actions of the optical transmitter in the second preferred embodiment. For a precondition, a target value of a detection value of a combined light beam detected by the detector 404 is assumed to be TP. More specifically, it is ideal that the first SOA 201 and the second SOA 202 do not vary in the light output intensity and the detection value of the combined light beam takes on TP.

First, two laser beams split by the splitter 2 are each input to the first optical modulator 101 and the second optical modulator 102 of the optical modulator 100, and the modulated light beams are output from the first optical modulator 101 and the second optical modulator 102 (Step S101). The modulated light beam from the first optical modulator 101 and the modulated light beam from the second optical modulator 102 are input to the first SOA 201 and the second SOA 202, respectively.

The controller 405 sets a control setting to $(X_i, Y_j)$ and drives the first and second SOAs 201, 202. The control setting $(X_i, Y_j)$ herein is set gains of the first and second SOAs 201, 202.

First, the controller 405 sets $X_i$ to a preset initial value by assuming that i=0 and $Y_j$=0. A control setting is $(X_i, 0)$ (Step S102). $Y_j$=0 herein indicates that the gain of the second SOA 202 is zero. In other words, the second SOA 202 through which no current flows has no output or has a slight amount of optical output.

In the control setting $(X_i, 0)$, the detector 404 then detects the light output intensity of the combiner 207 and determines the intensity as a detection value XP (Step S103). Since the second SOA 202 has no output herein, the light output intensity of the combiner 207 can be regarded as the light output intensity of the first SOA 201.

The controller 405 then judges whether an absolute value of a difference between the detection value XP and a half value of the target value TP is smaller than a threshold value (Step S104). The threshold value herein is, for example, 0.3 dB. If the absolute value of the difference is not smaller than the threshold value, continue to Step S105. In Step S105, the controller 405 changes the set value $X_i$ by adding a count to i (i=i+1). The controller 405 performs the feedback control by repeating Steps S103 to S105 until the absolute value of the difference becomes smaller than the threshold value in Step S104. If it is judged that the absolute value of the difference is smaller than the threshold value in Step S104, $X_i$ at that time is determined as a gain of the first SOA 201.

Next, $Y_j$ is set to a preset initial value by assuming that j=0 and $X_i$=0. A control setting is $(0, Y_j)$ (Step S106). If $X_i$ determined in the end is assumed to be the initial value of $Y_j$ herein, it is sufficient that $Y_j$ is adjusted by only an amount that causes individual differences of the first and second SOAs 201, 202, to thereby shorten time required for feedback processing in Steps S107 to S109, which will be described below. $X_i$=0 indicates that the gain of the first SOA 201 is zero. In other words, the first SOA 201 through which no current flows has no output or has a slight amount of optical output.

In the control setting $(0, Y_j)$, the detector 404 then detects the light output intensity of the combiner 207 and determines the intensity as a detection value YP (Step S107). Since the first SOA 201 has no output herein, the light output intensity of the combiner 207 can be regarded as the light output intensity of the second SOA 202.

The controller 405 then judges whether an absolute value of a difference between the detection value YP and the half value of the target value TP is smaller than a threshold value (Step S108). The threshold value herein is, for example, 0.3 dB. If the absolute value of the difference is not smaller than the threshold value, continue to Step S109. In Step S109, the controller 405 changes the set value $Y_j$ by adding a count to j (j=j+1). The controller 405 performs the feedback control by repeating Steps S107 to S109 until the absolute value of the difference becomes smaller than the threshold value in Step S108. If it is judged that the absolute value of the difference is smaller than the threshold value in Step S108, $Y_j$ at that time is determined as a gain of the second SOA 202.

The processing described above determines the control setting $(X_i, Y_j)$ that is the gains of the first and second SOAs 201, 202 (Step S110).

The steps described above adjust the gains such that the first and second SOAs 201, 202 are equal in the light output intensity. Therefore, the difference in the light output intensity between the polarized waves can be reduced when the combiner 207 polarizes and combines the outputs of the first and second SOAs 201, 202.

After the controller 405 determines the gains of the first and second SOAs 201, 202, changes in performance due to changes in ambient temperature of the optical transmitter and age deterioration of the first and second SOAs 201, 202 can be compensated by control described below.

In other words, the controller 405 causes the set gains to fluctuate at low frequencies in a time cycle. The set gains fluctuate slightly by, for example, 0.1% of the set gains. The controller 405 then sets, to new gains, gains when the detection value of the detector 404 gets closer to the target value TP (Step S111). In this manner, appropriate gains can be continuously set by repeatedly performing the action to cause the set gains to fluctuate in the time cycle to set new gains even in the case where the performance of the first and second SOAs 201, 202 changes with time.

<Effects>

The optical transmitter in the second preferred embodiment includes: the splitter 2 that splits an incident light beam into two light beams; the first optical modulator 101 and the second optical modulator 102 of the Mach-Zehnder type that modulate each of the light beams split by the splitter 2; the first SOA 201 and the second SOA 202 that are connected to the subsequent stage of the first optical modulator 101 and the subsequent stage of the second optical modulator 102, respectively; the combiner 207 that combines the output light beam of the first SOA 201 and the output light beam of the second SOA 202; the detector 404 that detects the light output intensity of the combiner 207; and the controller 405 that controls the gains of the first and second SOAs 201, 202 such that the first and second SOAs 201, 202 are equal in the light output intensity based on the detection value of the detector 404.

Therefore, the detector 404 is located in the subsequent stage of the first and second SOAs 201, 202, so that the feedback control on the gains can be performed based on the actual light output intensity after the amplification in the second preferred embodiment. The gains of the first and second SOAs 201, 202 can be appropriately set even in the case where the first and second SOAs 201, 202 are different in performance, and the difference in the light output intensity between the first and second SOAs 201, 202 can be reduced by performing the feedback control on the gains based on the actual light output intensity after the amplification. In the second preferred embodiment, the first and second SOAs 201, 202 individually amplify the two modulated light beams before the combiner 207 polarizes and combines the modulated light beams. Thus, the amplification on each of the modulated light beams can be controlled with higher accuracy than the case where the modulated light beams are amplified after being polarized and combined. Therefore, the optical transmitter in the second preferred embodiment can reduce the difference in the light output intensity between the modulated light beams with high accuracy by the simple configuration.

Further, the one detector 404 can perform the feedback control on both the gains of the first and second SOAs 201, 202 in the second preferred embodiment. Thus, the configuration of the optical transmitter can be further simplified compared to the optical transmitter in the first preferred embodiment.

In the optical transmitter in the second preferred embodiment, the controller 405 adjusts the gain of the first SOA 201 while the gain of the second SOA 202 is zero, and the controller 405 adjusts the gain of the second SOA 202 while the gain of the first SOA 201 is zero.

Therefore, the one detector 404 located in the subsequent stage of the combiner 207 can adjust each of the gains of the first and second SOAs 201, 202 by adjusting one of the gains of the first and second SOAs 201, 202 while the other gain is zero.

In the optical transmitter in the second preferred embodiment, the controller 405 repeatedly adjusts the gains of the first and second SOAs 201, 202 based on the detection value of the detector 404 when the controller 405 causes the gains of the first and second SOAs 201, 202 to fluctuate in the time cycle.

Therefore, the gains of the first and second SOAs 201, 202 are reset to more appropriate gains based on the detection value of the detector 404 while fluctuating in the time cycle, so that the gains can be continuously set to appropriate gains even in the case where the performance of the first and second SOAs 201, 202 changes with time due to the age deterioration.

A method for controlling the optical transmitter in the second preferred embodiment includes the steps of: (c) setting the gain of the first SOA 201 by the controller 405 while the gain of the second SOA 202 is zero; and (d) setting the gain of the second SOA 202 by the controller 405 while the gain of the first SOA 201 is zero after the step (c).

Therefore, the one detector 404 located in the subsequent stage of the combiner 207 can adjust each of the gains of the first and second SOAs 201, 202 by adjusting one of the gains of the first and second SOAs 201, 202 while the other gain is zero.

A method for controlling the optical transmitter in the second preferred embodiment includes the steps of: (e) obtaining the detection value of the detector 404 while the gains of the first and second SOAs 201, 202 are caused to fluctuate in the time cycle by the controller 405 after the step (d); and (f) setting the gains of the first and second SOAs 201, 202 by the controller 405 so as to bring the detection value closer to the preset target value based on the detection value of the detector 404 obtained in the step (e). The steps (e) and (f) are repeatedly performed.

Therefore, the gains of the first and second SOAs 201, 202 are reset to more appropriate gains based on the detection value of the detector 404 while fluctuating in the time cycle, so that the gains can be continuously set to appropriate gains even in the case where the performance of the first and second SOAs 201, 202 changes with time due to the age deterioration.

<Third Preferred Embodiment>
<Configuration>

In an optical transmitter in a third preferred embodiment, the optical transmitter and an optical transceiver 700 are optically interconnected with a transmission line such as an optical fiber, and information about a hit error rate (BER) can be obtained from the optical transceiver 700 through the transmission line.

In the optical transmitter in the third preferred embodiment, modulated light beams of a first optical modulator 101 and a second optical modulator 102 are amplified by a first SOA 201 and a second SOA 202, respectively, to be polarized and combined, and then transmitted to the optical transceiver 700 through the transmission line. The optical transceiver 700 detects the BER. The optical transmitter controls the gains of the first and second SOAs 201, 202 so as to reduce the detected BER. The optical transmitter in the third preferred embodiment does not need the detector that detects the light output intensity included in the optical transmitters in the first and second preferred embodiments.

Figure 5:
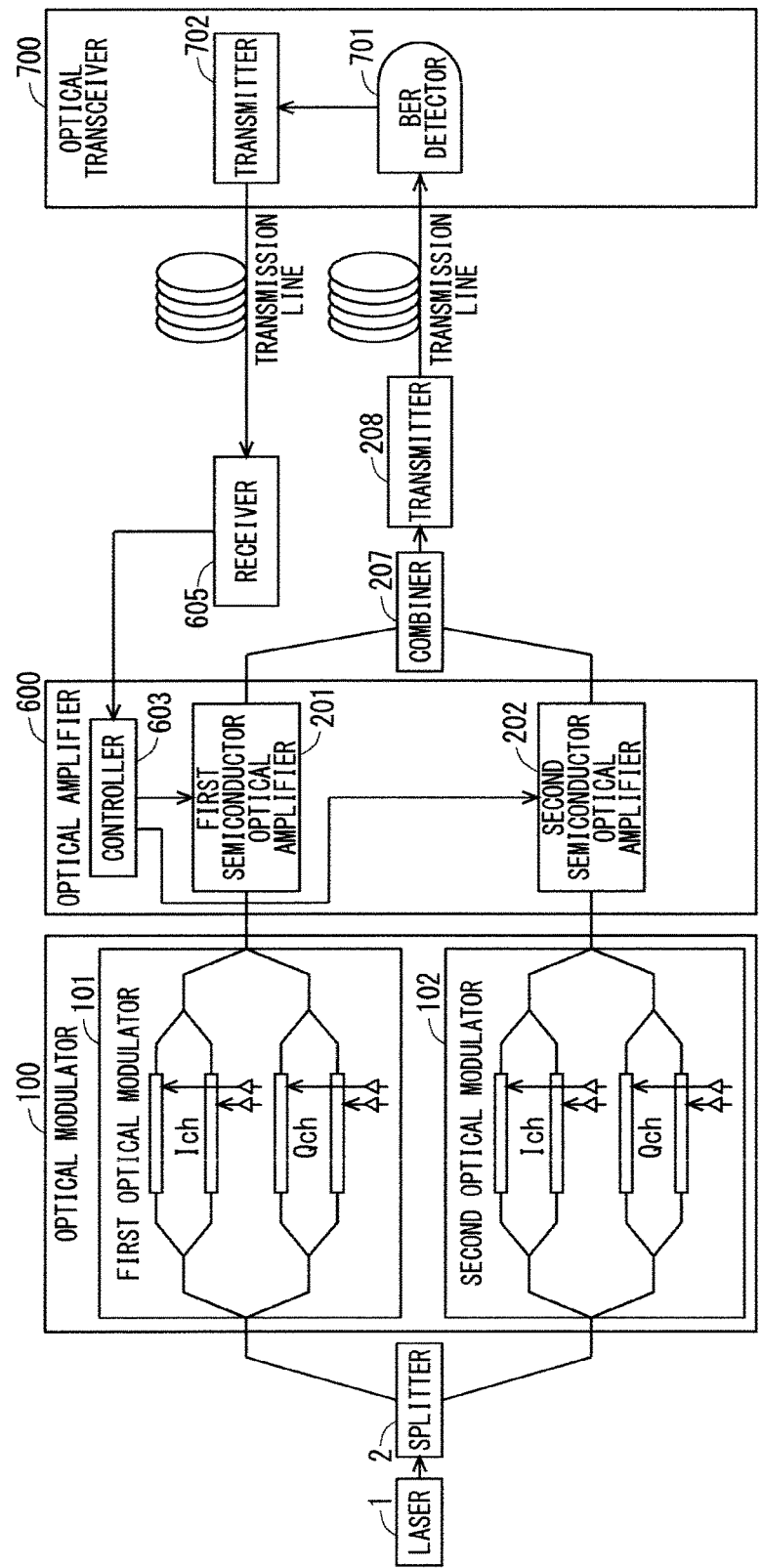
FIG. 5 is a block diagram showing a configuration of an optical transmitter according to a third preferred embodiment.

FIG. 5 is a block diagram showing a configuration of the optical transmitter in the third preferred embodiment. As shown in FIG. 5, the optical transmitter includes a splitter 2, an optical modulator 100, an optical amplifier 600, a combiner 207, a transmitter 208, and a receiver 605. The splitter 2, the optical modulator 100, and the combiner 207 are the same as those in the second preferred embodiment, so that the descriptions are omitted.

The optical amplifier 600 includes the first and second SOAs 201, 202 and a controller 603. The first SOA 201 and the second SOA 202 perform optical amplification on the optical output of the first optical modulator 101 and the optical output of the second optical modulator 102, respectively. The controller 603 controls the gains of the first and second SOAs 201, 202 based on the BER transmitted from the optical transceiver 700.

The first and second SOAs 201, 202 are optically connected to the combiner 207 with an optical fiber or a waveguide or in the space while the combiner 207 is optically connected to the transmitter 208 with an optical fiber or a waveguide or in the space. The controller 603 is electrically connected to the first and second SOAs 201, 202.

The configuration of the optical amplifier 600 is not limited to that in FIG. 5 as long as the semiconductor optical amplifiers individually amplify the optical output of each of the optical modulators and the gains of the semiconductor optical amplifiers are controlled based on the bit error rate.

The optical transmitter and the optical transceiver 700 are connected to each other with the transmission line. The optical transceiver 700 includes a BER detector 701 and a transmitter 702. The BER detector 701 detects the BER of the modulated light beam transmitted from the transmitter 208 through the transmission line. The transmitter 702 transmits the BER detected by the BER detector 701 to the optical transmitter through the transmission line. The controller 603 of the optical transmitter obtains the BER through the receiver 605.

The transmitter 208 is optically connected to the BER detector 701 with the transmission line, which is the optical fiber or a combination of the optical fiber and the optical amplifier, while the receiver 605 is optically connected to the transmitter 702 with the transmission line, which is the optical fiber or a combination of the optical fiber and the optical amplifier.

The configuration of the optical transmitter is not limited to FIG. 5 as long as optical outputs of the optical modulators are individually amplified by the first and second SOAs 201, 202 to be polarized and combined, and then transmitted by the optical transmitter to the optical transceiver connected to the optical transmitter with the transmission line, and the gains of the first and second SOAs 201, 202 are each adjusted based on the BER obtained from the optical transceiver 700.

In the third preferred embodiment, the first optical modulator 101, the second optical modulator 102, the first SOA 201, and the second SOA 202 may be integrated on the same substrate, similarly to the first and second preferred embodiments. The first optical modulator 101 and the second optical modulator 102 may have the same structure and the same characteristics. The first SOA 201 and the second SOA 202 may have the same structure and the same characteristics.

<Actions>

Figure 6:
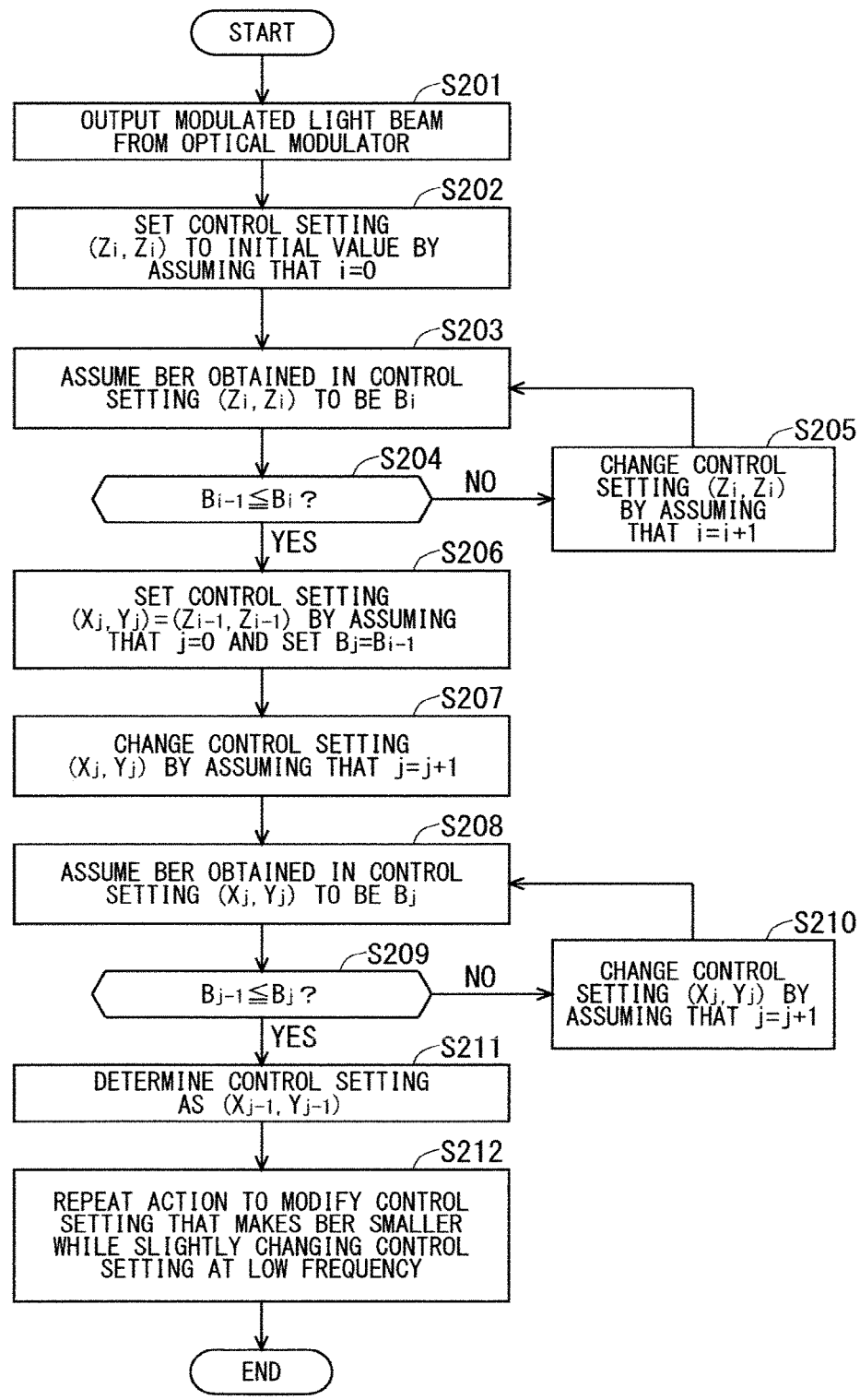
FIG. 6 is a flowchart showing actions of the optical transmitter according to the third preferred embodiment.

FIG. 6 is a flowchart showing actions of the optical transmitter in the third preferred embodiment. First, two laser beams split by the splitter 2 are each input to the first optical modulator 101 and the second optical modulator 102 of the optical modulator 100, and the modulated light beams are output from the first optical modulator 101 and the second optical modulator 102 (Step S201). The modulated light beam from the first optical modulator 101 and the modulated light beam from the second optical modulator 102 are input to the first SOA 201 and the second SOA 202, respectively.

The controller 603 sets a control setting to $(Z_i, Z_i)$ and drives the first and second SOAs 201, 202. The control setting $(Z_i, Z_i)$ herein is set gains of the first and second SOAs 201, 202. First, the controller 603 sets $Z_i$ to a preset initial value by assuming that i=0 (Step S202). The reason why the gains of the first and second SOAs 201, 202 are set to the common gain herein is to shorten the time required for adjusting the gains by roughly adjusting the gains of the first and second SOAs 201, 202 in Steps S203 to S205, which will be described below, and finely adjusting the gains in subsequent Steps S206 to S211.

In the control setting $(Z_i, Z_i)$, the optical transmitter transmits the modulated light beam to the optical transceiver 700 through the transmission line. The BER detector 701 detects the BER in the optical transceiver 700. The controller 603 obtains the BER detected by the BER detector 701 through the transmitter 702, the transmission line, and the receiver 605. In the control setting $(Z_i, Z_i)$, the BER obtained by the controller 603 is assumed to be $B_i$ (Step S203).

The controller 603 then judges whether $B_i$ is greater than or equal to $B_{i-1}$ (Step S204). If i=0 herein or Step S204 is performed first, there is no $B_{i-1}$, and thus continue to Step S205.

In Step S205, the controller 603 causes the value of the gain $Z_i$ common to the first and second SOAs 201, 202 to fluctuate by adding a count to i (i=i+1) to find the control setting $(Z_i, Z_i)$ that makes the BER smaller. Then, the BER is measured and assumed to be $B_i$ again in Step S203. The controller 603 judges again whether $B_i$ is greater than or equal to $B_{i-1}$ in Step S204. FIG. 7 is a graph showing a relationship between the BER ($B_i$) and count in the control setting. For i=1, for example, it is judged whether $B_1$ is greater than or equal to $B_0$ by comparing $B_0$ and $B_1$ in Step S204. Since $B_1$ is not greater than or equal to $B_0$ in FIG. 7, continue to Step S205 again.

As long as there is the control setting that makes the BER smaller, $B_i$ does not exceed $B_{i-1}$, so that the smallest BER and the control setting at that time can be found by repeating the feedback control of Steps S203 to S205. For example, it is clear from FIG. 7 that $B_3$ exceeds $B_2$ for the first time when i=3, and thus the control setting $(Z_2, Z_2)$ at a previous count (i=2) provides the smallest BER.

If the controller 603 judges that $B_i$ is greater than or equal to $B_{i-1}$ in Step S204, the common control setting is determined as $(Z_{i-1}, Z_{i-1})$, and continue to the step of adjusting the individual control setting $(X_j, Y_j)$ of the first SOA 201 and the second SOA 202.

The control setting $(X_j, Y_j)=(Z_{i-1}, Z_{i-1})$ is set by assuming that j=0. $B_j=B_{i-1}$ is set by assuming the BER in the control setting $(X_j, Y_j)$ to be $B_j$ (Step S206).

In Step S207, the controller 603 causes the value of the control setting $(X_j, Y_j)$ of the first and second SOAs 201, 202 to fluctuate within a prescribed range by adding a count to j (j=j+1) to find the control setting $(X_j, Y_j)$ that makes the BER smaller. Then, similarly to Step 203, the BER is measured and assumed to be $B_j$ (Step S208).

The controller 603 then judges whether $B_j$ is greater than or equal to $B_{j-1}$ (Step S209). if $B_j$ is not greater than or equal to $B_{j-1}$, continue to Step S210.

In Step S210, the controller 603 causes the value of the control setting $(X_j, Y_j)$ of the first and second SOAs 201, 202 to individually fluctuate by adding a count to j (j=j+1) to find the control setting $(X_j, Y_j)$ that makes the BER smaller. Then, the BER is measured and assumed to be $B_j$ again in Step S208. The controller 603 judges again whether $B_j$ is greater than or equal to $B_{j-1}$ in Step S209.

As long as there is the control setting that makes the BER smaller, $B_j$ does not exceed $B_{j-1}$, so that the smallest BER and the control setting at that time can be found by repeating the feedback control of Steps S208 to S210.

If the controller 603 judges that $B_j$ is greater than or equal to $B_{j-1}$ in Step S209, the control setting that provides the smallest BER is determined as $(X_{j-1}, Y_{j-1})$ (Step S211).

As described above, the BER of the modulated light beam transmitted by the transmitter can be minimized by setting the gains of the first and second SOAs 201, 202 to the control setting $(X_{j-1}, Y_{j-1})$.

After the controller 603 determines the gains of the first and second SOAs 201, 202, changes in performance due to changes in ambient temperature of the optical transmitter and age deterioration of the first and second SOAs 201, 202 can be compensated by control described below.

In other words, the controller 603 causes the set gains to fluctuate at low frequencies in a time cycle. The set gains fluctuate slightly by, for example, 0.1% of the set gains. The controller 603 then sets gains when the optical transceiver 700 obtains the smaller BER to a new control setting (Step S212). In this manner, appropriate gains can be continuously set by repeatedly performing the action to cause the set gains to fluctuate in the time cycle to set more appropriate new gains even in the case where the performance of the first and second SOAs 201, 202 changes with time. The action can always optimize the transmission performance of the optical transmitter.

The optical transmitters in the first and second preferred embodiments may be applied to an optical communication system in which the optical receiver receives an optical signal transmitted from the optical transmitter through the transmission line, which is the optical fiber, similarly to the third preferred embodiment. The plurality of optical transmitters in the first to third preferred embodiments may be applied to a wavelength division multiplexing (WDM) optical communication system in which wavelengths of optical signals transmitted from the plurality of optical transmitters are multiplexed and transmitted through the optical fiber, and the plurality of optical receivers separate the wavelengths on the receiver side to receive each of the wavelengths.

<Effects>

The optical transmitter in the third preferred embodiment includes: the splitter 2 that splits an incident light beam into two light beams; the first optical modulator 101 and the second optical modulator 102 of the Mach-Zehnder type that modulate each of the light beams split by the splitter 2; the first SOA 201 and the second SOA 202 that are connected to the subsequent stage of the first optical modulator 101 and the subsequent stage of the second optical modulator 102, respectively; the combiner 207 that combines the output light beam of the first SOA 201 and the output light beam of the second SOA 202; the transmitter 208 that transmits the optical output of the combiner 207 to the optical transceiver 700 through the transmission line; and the controller 603 that controls the gains of the first and second SOAs 201, 202 so as to reduce the bit error rate based on the bit error rate detected by the optical transceiver 700.

Therefore, the BER detected by the optical transceiver 700 connected to the optical transmitter with the transmission line is obtained, so that the feedback control on the gains can be performed based on the BER of the modulated light beam actually transmitted through the transmission line in the third preferred embodiment. The gains of the first and second SOAs 201, 202 can be appropriately set even in the case where the polarized waves have the different transmission performance in the transmission line, and the BER of the modulated light beam to be transmitted can be reduced by performing the feedback control on the gains based on the BER of the modulated light beam actually transmitted through the transmission line. In the third preferred embodiment, the first and second SOAs 201, 202 individually amplify the two modulated light beams before the combiner 207 polarizes and combines the modulated light beams. Thus, the amplification on each of the modulated light beams can be controlled with higher accuracy than the case where the modulated light beams are amplified after being polarized and combined. Therefore, the optical transmitter in the third preferred embodiment can reduce the bit error rate of the modulated light beam to be transmitted by the simple configuration.

Further, the gains are controlled based on the BER detected by the optical transceiver 700 connected to the optical transmitter with the transmission line, thereby eliminating the need for the detector that detects the light intensity in the third preferred embodiment. Thus, the configuration of the optical transmitter can be further simplified compared to the optical transmitter in the first and second preferred embodiments.

In the optical transmitter in the third preferred embodiment, the controller 603 sets the gain common to the first and second SOAs 201, 202 so as to reduce the bit error rate, and then adjusts each of the gains of the first and second SOAs 201, 202 so as to further reduce the bit error rate.

Therefore, the time required for adjusting the gains can be shortened by roughly adjusting the gains of the first and second SOAs 201, 202 as the common value and then finely adjusting each of the gains of the first and second SOAs 201, 202.

In the optical transmitter in the third preferred embodiment, the controller 603 repeatedly adjusts the gains of the first and second SOAs 201, 202 based on the bit error rate when the controller 603 causes the gains of the first and second SOAs 201, 202 to fluctuate in the time cycle.

Therefore, the gains of the first and second SOAs 201, 202 are reset to more appropriate gains based on the detection value of the optical transceiver 700 while fluctuating in the time cycle, so that the gains can be continuously set to appropriate gains even in the case where the performance of the first and second SOAs 201, 202 changes with time due to the age deterioration.

A method for controlling the optical transmitter in the third preferred embodiment includes the steps of: (g) setting the gain common to the first and second SOAs 201, 202 by the controller 603 so as to reduce the bit error rate; and (h) adjusting each of the gains of the first and second SOAs 201, 202 by the controller 603 to further reduce the bit error rate after the step (g).

Therefore, the time required for adjusting the gains can be shortened by roughly adjusting the gains of the first and second SOAs 201, 202 as the common value and then finely adjusting each of the gains of the first and second SOAs 201, 202.

A method for controlling the optical transmitter in the third preferred embodiment further includes the steps of: (i) obtaining the bit error rate while the gains of the first and second SOAs 201, 202 are caused to fluctuate in the time cycle by the controller 603 after the step (h); and (j) adjusting the gains of the first and second SOAs 201, 202 by the controller 603 based on the bit error rate obtained in the step (i). The steps (i) and (j) are repeatedly performed.

Therefore, the gains of the first and second SOAs 201, 202 are reset to more appropriate gains based on the detection value of the optical transceiver 700 while fluctuating in the time cycle, so that the gains can be continuously set to appropriate gains even in the case where the performance of the first and second SOAs 201, 202 changes with time due to the age deterioration.

<Fourth Preferred Embodiment>
<Configuration>

Figure 8:
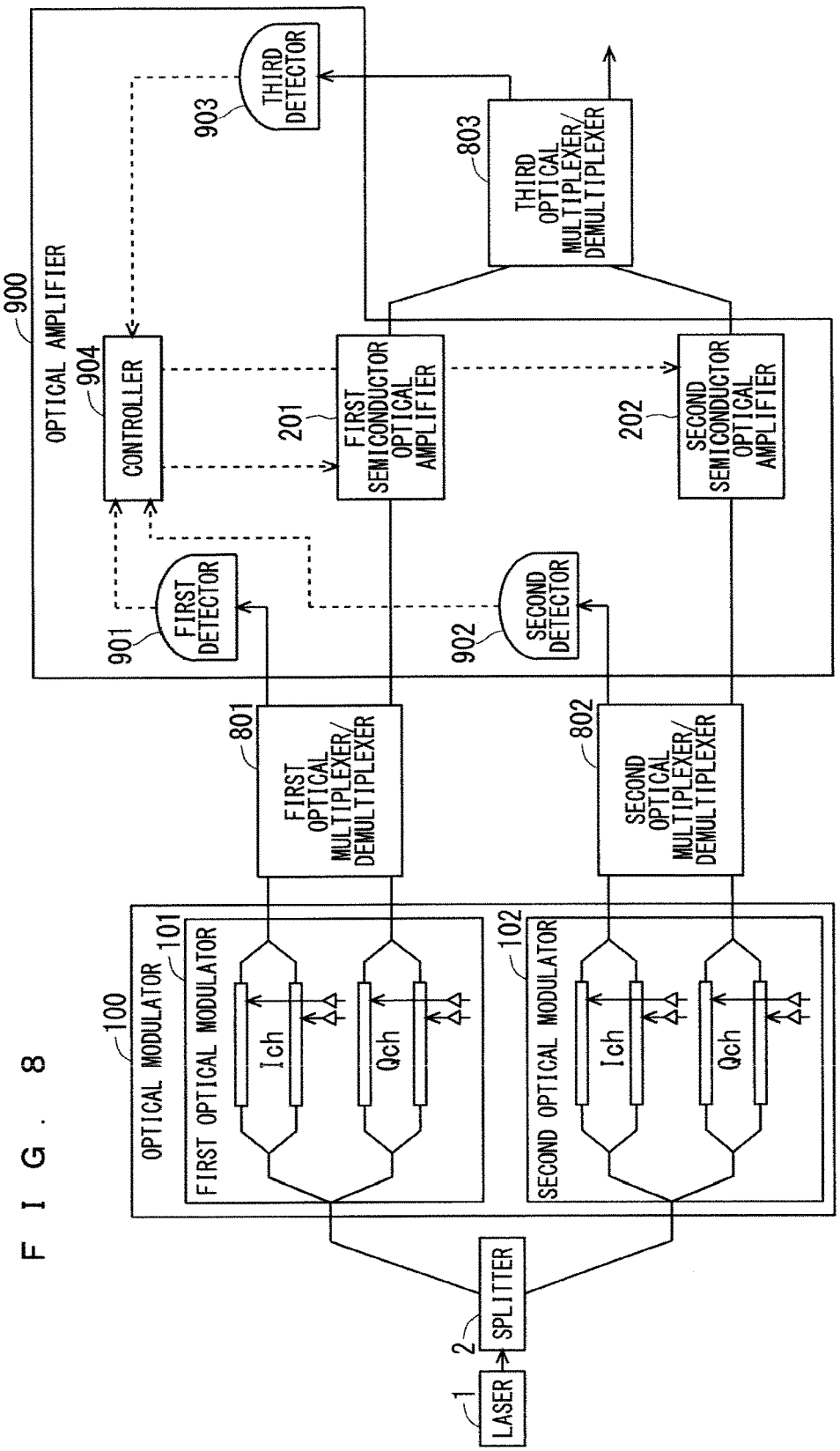
FIG. 8 is a block diagram showing a configuration of an optical transmitter according to a fourth preferred embodiment.

FIG. 8 is a block diagram showing a configuration of an optical transmitter in a fourth preferred embodiment. As shown in FIG. 8, the optical transmitter includes a splitter 2, an optical modulator 100, an optical amplifier 900, a first optical multiplexer/demultiplexer 801, a second optical multiplexer/demultiplexer 802, and a third optical multiplexer/demultiplexer 803. The splitter 2 and the optical modulator 100 are the same as those in the first preferred embodiment, so that the descriptions are omitted.

The optical amplifier 900 includes a first SOA 201, a second SOA 202, a first detector 901, a second detector 902, a third detector 903, and a controller 904. The first SOA 201 and the second SOA 202 perform optical amplification on the optical output of the first optical modulator 101 and the optical output of the second optical modulator 102, respectively.

The first optical multiplexer/demultiplexer 801 multiplexes an Ich optical signal and a Qch optical signal of the first optical modulator 101. The multiplexed light beam is output to each of the first SOA 201 and the first detector 901 by a ratio of 1:1. Similarly, the second optical multiplexer/demultiplexer 802 multiplexes an Ich optical signal and a Qch optical signal of the second optical modulator 102. The multiplexed light beam is output to each of the second SOA 202 and the second detector 902 by a ratio of 1:1.

The third optical multiplexer/demultiplexer 803 polarizes and combines optical signals output from each of the first SOA 201 and the second SOA 202. The light beam that has been polarized and combined is output to each of the third detector 903 and an output destination, which is not shown, by a ratio of 1:1. The first to third optical multiplexers/demultiplexers 801, 802, 803 are each a multimode interference (MMI) device.

The first detector 901 is located in a preceding stage of the first SOA 201 and detects the light output intensity of the first optical modulator 101. The second detector 902 is located in a preceding stage of the second SOA 202 and detects the light output intensity of the second optical modulator 102. The third detector 903 detects the light output intensity of a combined light beam that is polarized and combined by the third optical multiplexer/demultiplexer 803. The first to third detectors 901, 902, 903 are each a photodiode (PD), for example.

The controller 904 controls gains of the first and second SOAs 201, 202 based on detection values of the first to third detectors 901, 902, 903.

The first and second SOAs 201, 202 are optically connected to the third optical multiplexer/demultiplexer 803 with a waveguide or an optical fiber or in the space while the third optical multiplexer/demultiplexer 803 is optically connected to the third detector 903 with a waveguide or an optical fiber or in the space. The controller 904 is electrically connected to the first to third detectors 901, 902, 903 and the first and second SOAs 201, 202.

The configuration of the optical amplifier 900 is not limited to that in FIG. 8 as long as the first detector 901 and the second detector 902 respectively detect the light output intensity of the first optical modulator 101 and the light output intensity of the second optical modulator 102, the third detector 903 detects the light output intensity of the combined light beam that has been amplified by each of the first and second SOAs 201, 202 and combined, and the controller 904 controls each of the gains of the first and second SOAs 201, 202 based on the detection results by the first to third detectors 901, 902, 903.

In the fourth preferred embodiment, the first optical modulator 101, the second optical modulator 102, the first SOA 201, and the second SOA 202 may be integrated on the same substrate, similarly to the first to third preferred embodiments. The first optical modulator 101 and the second optical modulator 102 may have the same structure and the same characteristics. The first SOA 201 and the second SOA 202 may have the same structure and the same characteristics.

<Actions>

For a precondition, a target value of a detection value of a combined light beam detected by the third detector 903 is assumed to be TP. More specifically, it is ideal that the first SOA 201 and the second SOA 202 do not vary in the light output intensity and the detection value of the combined light beam takes on TP. Further, a set gain of the first SOA 201 and a set gain of the second SOA 202 are controlled by the controller 904 to be less than or equal to a target gain G1 and a target gain G2, respectively, in the fourth preferred embodiment.

Herein, the target gain G1 of the first SOA 201 and the target gain G2 of the second SOA 202 are each an upper limit on a gain that suppresses deterioration in the transmission performance of the modulated light beam. The target gain G1 and the target gain G2 are predetermined according to characteristics of the first semiconductor optical amplifier 201 and the second semiconductor optical amplifier 202, respectively. If the first SOA 201 and the second SOA 202 have the same structure and the same characteristics, the target gain G1 and the target gain G2 are the same values within a range of manufacturing error.

Figure 9:
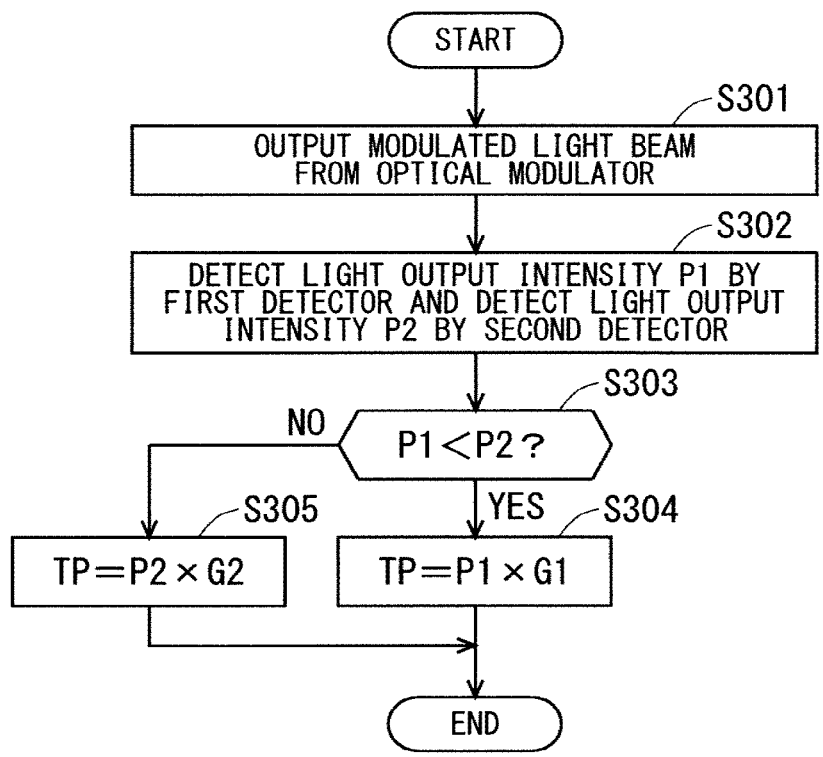
FIG. 9 is a flowchart showing actions of the optical transmitter to determine a target value according to the fourth preferred embodiment.

First, the controller 904 determines a target value TP. FIG. 9 is a flowchart showing actions of the optical transmitter to determine the target value.

Two laser beams split by the splitter 2 are each input to the first optical modulator 101 and the second optical modulator 102 of the optical modulator 100, and the modulated light beams are output from the first optical modulator 101 and the second optical modulator 102 (Step S301). The first detector 901 then detects the light output intensity of the first optical modulator 101 (Step S302). The light output intensity detected by the first detector 901 is assumed to be P1. Similarly, the second detector 902 detects the light output intensity of the second optical modulator 102. The light output intensity detected by the second detector 902 is assumed to be P2. The light output intensity P1, P2 is input to the controller 904.

The controller 904 then judges whether the light output intensity P1 is smaller than the light output intensity P2 (Step S303). If the light output intensity P1 is smaller than the light output intensity P2, the controller 904 calculates P1×G1 to determine the target value TP (Step S304). If the light output intensity P1 is greater than the light output intensity P2, the controller 904 calculates P2×G1 to determine the target value TP (Step S305).

The target value TP is determined as described above. The following actions of the controller 904 are the same as those described with reference to FIG. 4 in the second preferred embodiment. Thus, the actions of the controller 904 will be described with reference to FIG. 4.

First, the controller 904 sets the control setting of the first and second SOAs 201, 202 to ($X_i$, 0) (corresponding to Step S102 in FIG. 4). The initial value of $X_i$ is set to a value smaller than the target gain G1. In the control setting ($X_i$, 0), the third detector 903 then detects the light output intensity of the third optical multiplexer/demultiplexer 803 and determines the intensity as a detection value XP (corresponding to Step S103 in FIG. 4). Since the second SOA 202 has no output herein, the light output intensity of the third optical multiplexer/demultiplexer 803 can be regarded as the light output intensity of the first SOA 201.

The controller 904 then performs the feedback control of Steps S103 to S105 in FIG. 4 to determine the gain $X_i$ of the first SOA 201. The determined gain Xi of the first SOA 201 is less than or equal to the target gain G1.

Next, the controller 904 sets the control setting of the first and second SOAs 201, 202 to (0, $Y_j$) (corresponding to Step S106 in FIG. 4). The initial value of $Y_j$ is set to a value smaller than the target gain G2. In the control setting (0, $Y_j$), the third detector 903 then detects the light output intensity of the third optical multiplexer/demultiplexer 803 and determines the intensity as a detection value YP (corresponding to Step S107 in FIG. 4). Since the first SOA 201 has no output herein, the light output intensity of the third optical multiplexer/demultiplexer 803 can be regarded as the light output intensity of the second SOA 202.

The controller 904 then performs the feedback control of Steps S107 to S109 in FIG. 4 to determine the gain $Y_j$ of the second SOA 202. The determined gain $Y_j$ of the second SOA 202 is less than or equal to the target gain G2.

The processing described above determines the control setting ($X_i$, $Y_j$) as the gains of the first and second SOAs 201, 202 (corresponding to Step S110 in FIG. 4).

The steps described above adjust the gains such that the first and second SOAs 201, 202 are equal in the light output intensity. Therefore, the difference in the light output intensity between the polarized waves can be reduced when the third optical multiplexer/demultiplexer 803 polarizes and combines the outputs of the first and second SOAs 201, 202. Further, the gain of the first SOA 201 and the gain of the second SOA 202 are adjusted to be less than or equal to the target gain G1 and the target gain G2, respectively, in the fourth preferred embodiment.

After the controller 904 determines the gains of the first and second SOAs 201, 202, changes in performance due to changes in ambient temperature of the optical transmitter and age deterioration of the first and second SOAs 201, 202 can be compensated by control described below.

In other words, the controller 904 causes the set gains to fluctuate at low frequencies in a time cycle. The set gains fluctuate slightly by, for example, 0.1% of the set gains. The controller 904 then sets, to new gains, gains when the detection value of the third detector 903 gets closer to the target value TP (corresponding to Step S111 in FIG. 4). In this manner, appropriate gains can be continuously set by repeatedly performing the action to cause the set gains to fluctuate in the time cycle to set new gains even in the case where the performance of the first and second SOAs 201, 202 changes with time.

In the fourth preferred embodiment, the controller 904 can monitor whether the gain of the first SOA 201 exceeds the target gain G1 with high accuracy by calculating P1/P3 based on the detection values of the first detector 901 and the third detector 903. Similarly, the controller 904 can monitor whether the gain of the second SOA 202 exceeds the target gain G2 with high accuracy by calculating P2/P3 based on the detection values of the second detector 902 and the third detector 903.

<Effects>

The optical transmitter in the fourth preferred embodiment includes: the splitter 2 that splits an incident light beam into two light beams; the first optical modulator 101 and the second optical modulator 102 of the Mach-Zehnder type that modulate each of the light beams split by the splitter 2; the first semiconductor optical amplifier 201 and the second semiconductor optical amplifier 202 that are connected to the subsequent stage of the first optical modulator 101 and the subsequent stage of the second optical modulator 102, respectively; the combiner (namely, the third optical multiplexer/demultiplexer 803) that combines the output light beam of the first semiconductor optical amplifier 201 and the output light beam of the second semiconductor optical amplifier 202; the first detector 901 that is located in the preceding stage of the first semiconductor optical amplifier 201 and detects the light output intensity of the first optical modulator 101; the second detector 902 that is located in the preceding stage of the second semiconductor optical amplifier 202 and detects the light output intensity of the second optical modulator 102; the third detector 903 that detects the light output intensity of the combiner; and the controller 904 that sets the gains of the first and second semiconductor optical amplifiers 201, 202 such that the first and second semiconductor optical amplifiers 201, 202 are equal in the light output intensity, the gain of the first semiconductor optical amplifier 201 is less than or equal to the target gain G1, and the gain of the second semiconductor optical amplifier 202 is less than or equal to the target gain G2, based on the detection values of the first, second, and third detectors 901, 902, 903. The target gain G1 of the first semiconductor optical amplifier 201 and the target gain G2 of the second semiconductor optical amplifier are each the upper limit on the gain that suppresses deterioration in the transmission performance of the modulated light beam.

In the optical transmitter in the fourth preferred embodiment, the first detector 901 is located in the preceding stage of the first SOA 201 while the second detector 902 is located in the preceding stage of the second SOA 202. Thus, the target value of the light output intensity of the combined light beam output from the optical transmitter can be determined within the range in which the gains of the first and second SOAs 201, 202 do not exceed the target gains G1, G2. In the fourth preferred embodiment, the third detector 903 is located in the subsequent stage of the combiner (namely, the third optical multiplexer/demultiplexer 803) that combines the output light beams of the first and second SOAs 201, 202, so that the feedback control on the gains can be performed based on the actual light output intensity after the amplification. The gains of the first and second SOAs 201, 202 can be appropriately set even in the case where the first and second SOAs 201, 202 are different in performance, and the difference in the light output intensity between the first and second SOAs 201, 202 can be reduced by performing the feedback control on the gains based on the actual light output intensity after the amplification.

In the optical transmitter in the fourth preferred embodiment, the gains are controlled to reduce the difference in the light output intensity between the first and second SOAs 201, 202 within the range in which the gains of the first and second SOAs 201, 202 are less than or equal to the target gains G1, G2 serving as the upper limit on the gain that suppresses deterioration in the transmission performance of the modulated light beam. Therefore, the optical transmitter can combine and transmit the modulated light beam of the high quality since the optical transmitter can achieve both of the increased light output intensity and the suppressed deterioration in the transmission performance.

In the optical transmitter in the fourth preferred embodiment, the controller 904 repeatedly adjusts the gains of the first and second semiconductor optical amplifiers 201, 202 based on the detection values of the first to third detectors 901, 902, 903 when the controller 904 causes the gains of the first and second semiconductor optical amplifiers 201, 202 to fluctuate in the time cycle.

Therefore, the gains of the first and second SOAs 201, 202 are reset to more appropriate gains based on the detection values of the first to third detectors 901, 902, 903 while fluctuating in the time cycle, so that the gains can be continuously set to appropriate gains even in the case where the performance of the first and second SOAs 201, 202 changes with time due to the age deterioration.

In addition, according to the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:
1. An optical transmitter, comprising:
a splitter that splits an incident light beam into two light beams;
a first optical modulator and a second optical modulator of a Mach-Zehnder type that modulate each of the light beams split by said splitter;
a first semiconductor optical amplifier and a second semiconductor optical amplifier that are connected to a subsequent stage of said first optical modulator and a subsequent stage of said second optical modulator, respectively;
a first detector and a second detector that detect light output intensity of said first semiconductor optical amplifier and light output intensity of said second semiconductor optical amplifier, respectively;
a controller that sets gains of said first and second semiconductor optical amplifiers such that said first and second semiconductor optical amplifiers are equal in the light output intensity based on detection values of said first and second detectors; and
a combiner that combines an output light beam of said first semiconductor optical amplifier and an output light beam of said second semiconductor optical amplifier,
wherein said first detector is connected between said first semiconductor optical amplifier and said combiner, and detects said light output intensity of said first semiconductor optical amplifier,
said second detector is connected between said second semiconductor optical amplifier and said combiner, and detects said light output intensity of said second semiconductor optical amplifier, and
said first optical modulator, said second optical modulator, said first semiconductor optical amplifier, and said second semiconductor optical amplifier are integrated on a same substrate.

2. The optical transmitter according to claim 1, wherein said controller repeatedly adjusts the gains of said first and second semiconductor optical amplifiers based on the detection values of said first and second detectors when said controller causes the gains of said first and second semiconductor optical amplifiers to fluctuate in a time cycle.

3. An optical transmitter, comprising:
a splitter that splits an incident light beam into two light beams;
a first optical modulator and a second optical modulator of a Mach-Zehnder type that modulate each of the light beams split by said splitter;
a first semiconductor optical amplifier and a second semiconductor optical amplifier that are connected to a subsequent stage of said first optical modulator and a subsequent stage of said second optical modulator, respectively;
a combiner that combines an output light beam of said first semiconductor optical amplifier and an output light beam of said second semiconductor optical amplifier;
a first detector that is located in a preceding stage of said first semiconductor optical amplifier and detects light output intensity of said first optical modulator;
a second detector that is located in a preceding stage of said second semiconductor optical amplifier and detects light output intensity of said second optical modulator;
a third detector that detects light output intensity of said combiner; and
a controller that sets gains of said first and second semiconductor optical amplifiers such that said first and second semiconductor optical amplifiers are equal in the light output intensity, the gain of said first semiconductor optical amplifier is less than or equal to a target gain, and the gain of said second semiconductor optical amplifier is less than or equal to a target gain, based on detection values of said first, second, and third detectors.

4. The optical transmitter according to claim 3, wherein said controller repeatedly adjusts the gains of said first and second semiconductor optical amplifiers based on the detection values of said first, second, and third detectors when said controller causes the gains of said first and second semiconductor optical amplifiers to fluctuate in a time cycle.

5. An optical transmitter, comprising:
a splitter that splits an incident light beam into two light beams;
a first optical modulator and a second optical modulator of a Mach-Zehnder type that modulate each of the light beams split by said splitter;
a first semiconductor optical amplifier and a second semiconductor optical amplifier that are connected to a subsequent stage of said first optical modulator and a subsequent stage of said second optical modulator, respectively;

a combiner that combines an output light beam of said first semiconductor optical amplifier and an output light beam of said second semiconductor optical amplifier;

a detector that detects light output intensity of said combiner; and a controller that controls gains of said first and second semiconductor optical amplifiers such that said first and second semiconductor amplifiers are equal in the light output intensity based on a detection value of said detector, wherein said controller adjusts the gain of said first semiconductor optical amplifier while the gain of said second semiconductor optical amplifier is zero, and said controller adjusts the gain of said second semiconductor optical amplifier while the gain of said first semiconductor optical amplifier is zero.

6. The optical transmitter according to claim 5, wherein said controller repeatedly adjusts the gains of said first and second semiconductor optical amplifiers based on the detection value of said detector when said controller causes the gains of said first and second semiconductor optical amplifiers to fluctuate in a time cycle.

7. The optical transmitter according to claim 3, wherein said target gain of said first semiconductor optical amplifier and said target gain of said second semiconductor optical amplifier are each an upper limit on a gain that suppresses deterioration in transmission performance of a modulated light beam.

* * * * *